United States Patent [19]

Nevarez

[11] Patent Number: 4,586,677
[45] Date of Patent: May 6, 1986

[54] TAKE-UP DEVICE FOR DRIP IRRIGATION LINES

[75] Inventor: Enrique F. Nevarez, Star Rte. 1, Box 201, Gila Bend, Ariz. 85337

[73] Assignees: Enrique F. Nevarez; Gordon W. Crossman; Billy C. Nall, all of Gila Bend, Ariz.

[21] Appl. No.: 539,555

[22] Filed: Oct. 6, 1983

[51] Int. Cl.⁴ ............................................. B65H 75/40
[52] U.S. Cl. .................................. 242/86.8; 239/198
[58] Field of Search ................... 242/86.2, 86.7, 156, 242/86.8, 158 B, 86.5 R; 239/189, 199

[56] References Cited

U.S. PATENT DOCUMENTS

| | | | |
|---|---|---|---|
| 481,641 | 8/1892 | Schneider | 242/86.8 X |
| 2,008,612 | 7/1935 | Heath | 242/86.7 |
| 2,509,476 | 5/1950 | Brown | 242/86.2 |
| 3,000,588 | 9/1961 | Brady | 242/86.5 R |
| 3,544,031 | 12/1970 | White | 242/86.5 R |
| 3,650,492 | 3/1972 | Stum | 242/86.7 |
| 3,661,340 | 5/1972 | Trussell | 242/86.8 |
| 3,753,409 | 8/1973 | Frazier | 242/86.2 X |
| 3,764,031 | 10/1973 | Parsen | 242/86.5 R X |

Primary Examiner—Stephen Marcus
Assistant Examiner—Leo James Peters
Attorney, Agent, or Firm—Gregory J. Nelson

[57] ABSTRACT

A take-up system for drip irrigation lines consisting of a mobile frame supported on wheels or skids. A predetermined number of take-up bays are provided along the frame. Each bay includes a cable spindle which is positively driven across a clutch by a hydraulic or pneumatic motor. A disk brake is hydraulically actuated to allow the operator to control the speed of the reel. A bearing support assembly is detachably secured to the reels. Each reel bay further includes a leveler which consists of a mechanically oscillatable carriage having a guide at the bottom through which one tubing line passes. The leveler applies the line on the reel evenly as the reel rotates. Cable reels may be removed and replaced with empty reels as required. The device is also operable to control pay-out of lines when the lines are being placed in the field at the beginning of the growing season.

1 Claim, 14 Drawing Figures

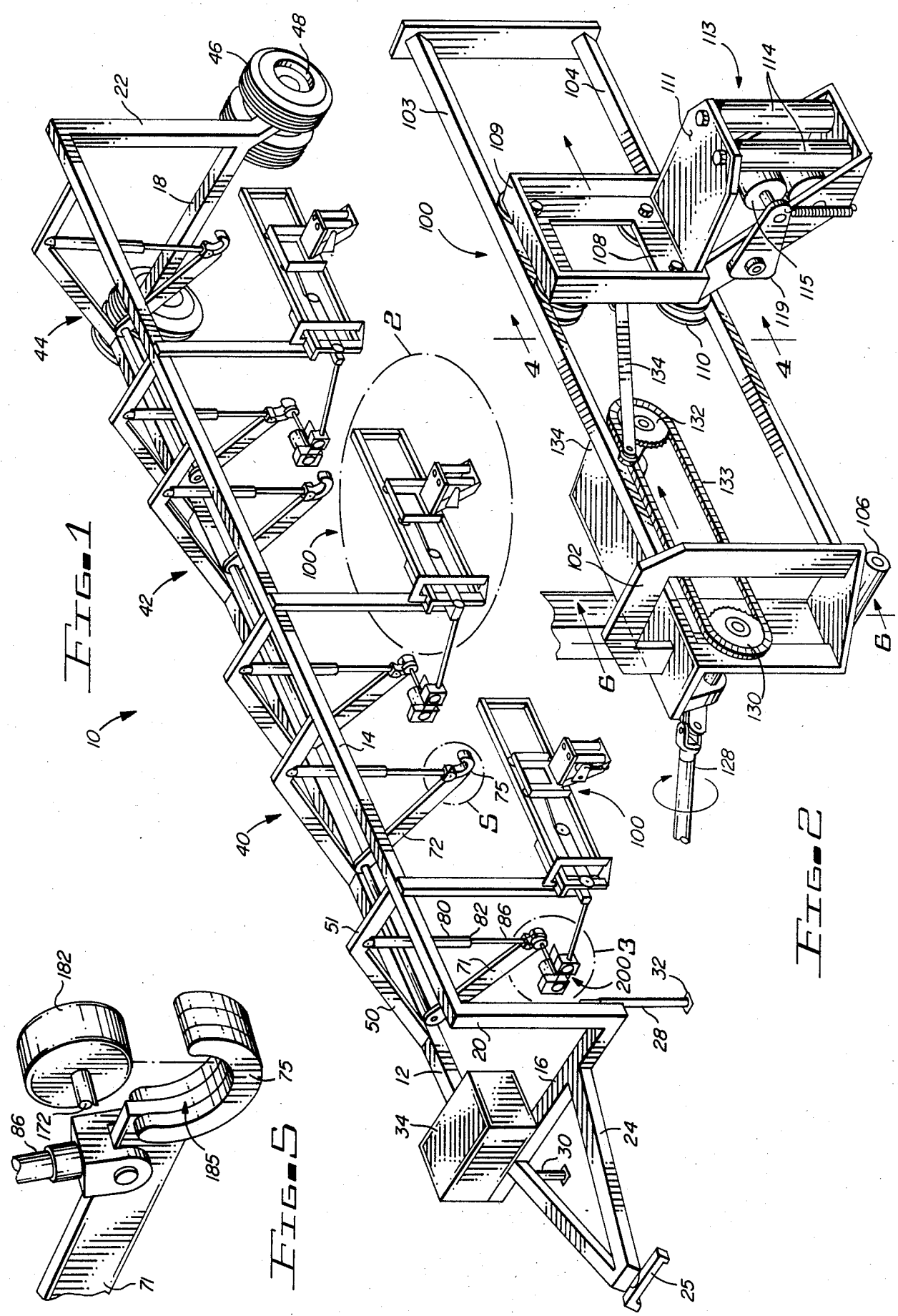

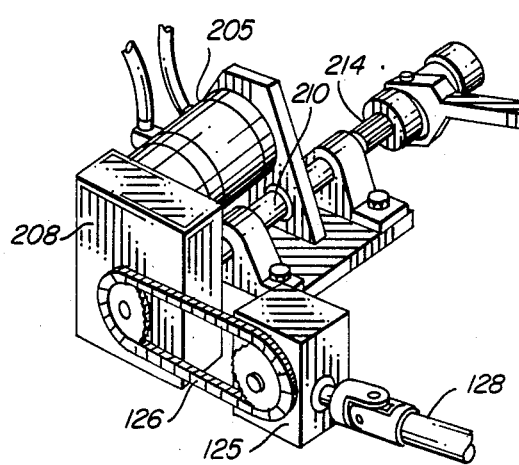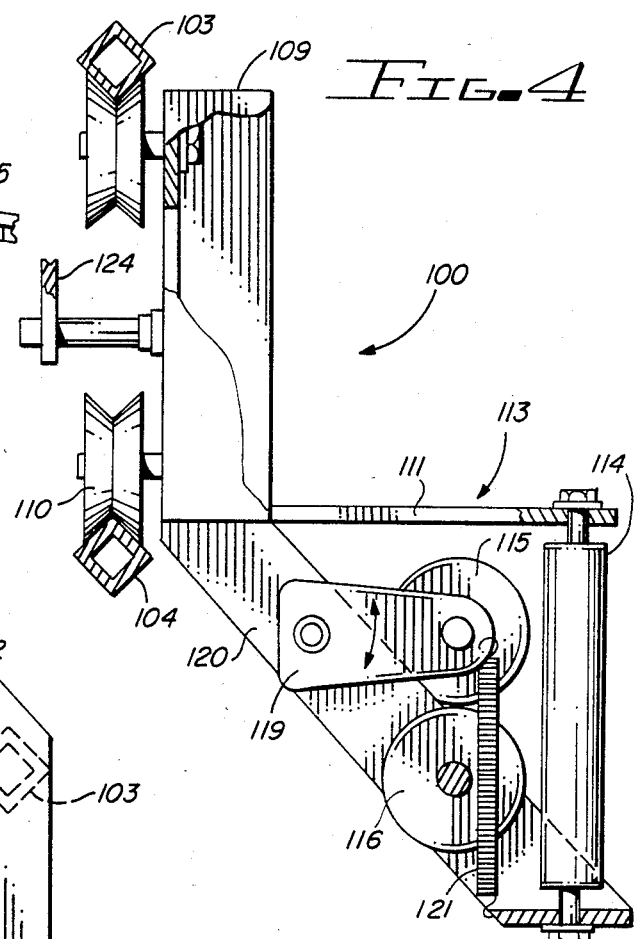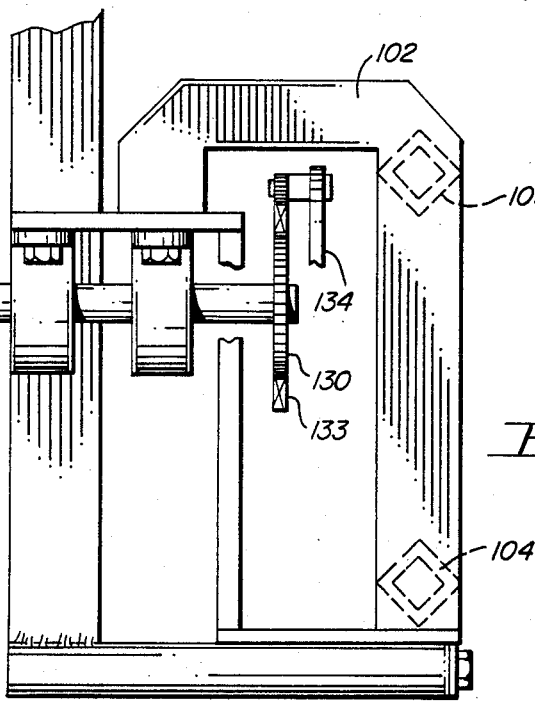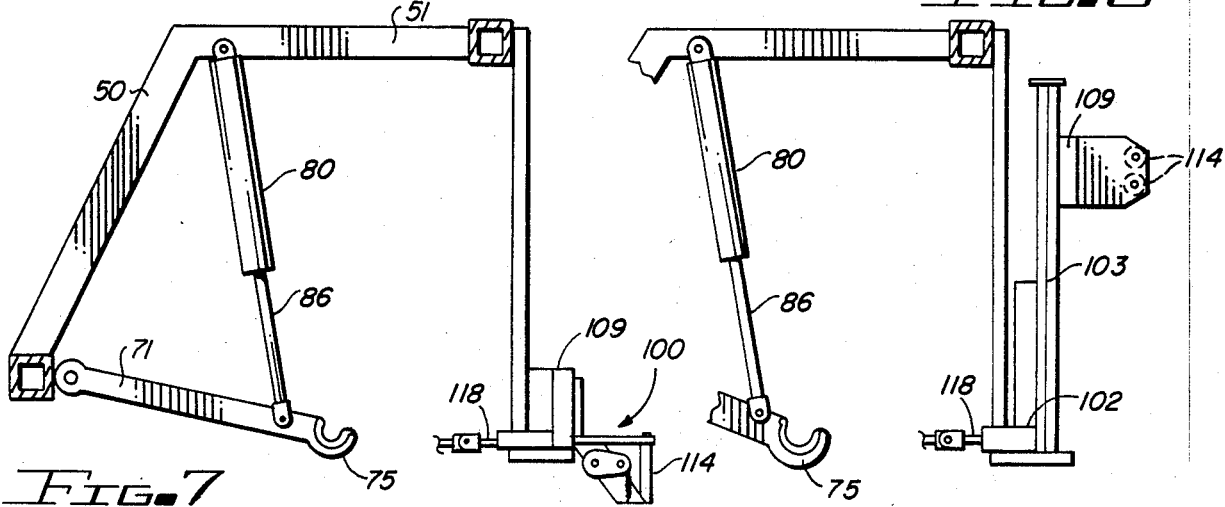

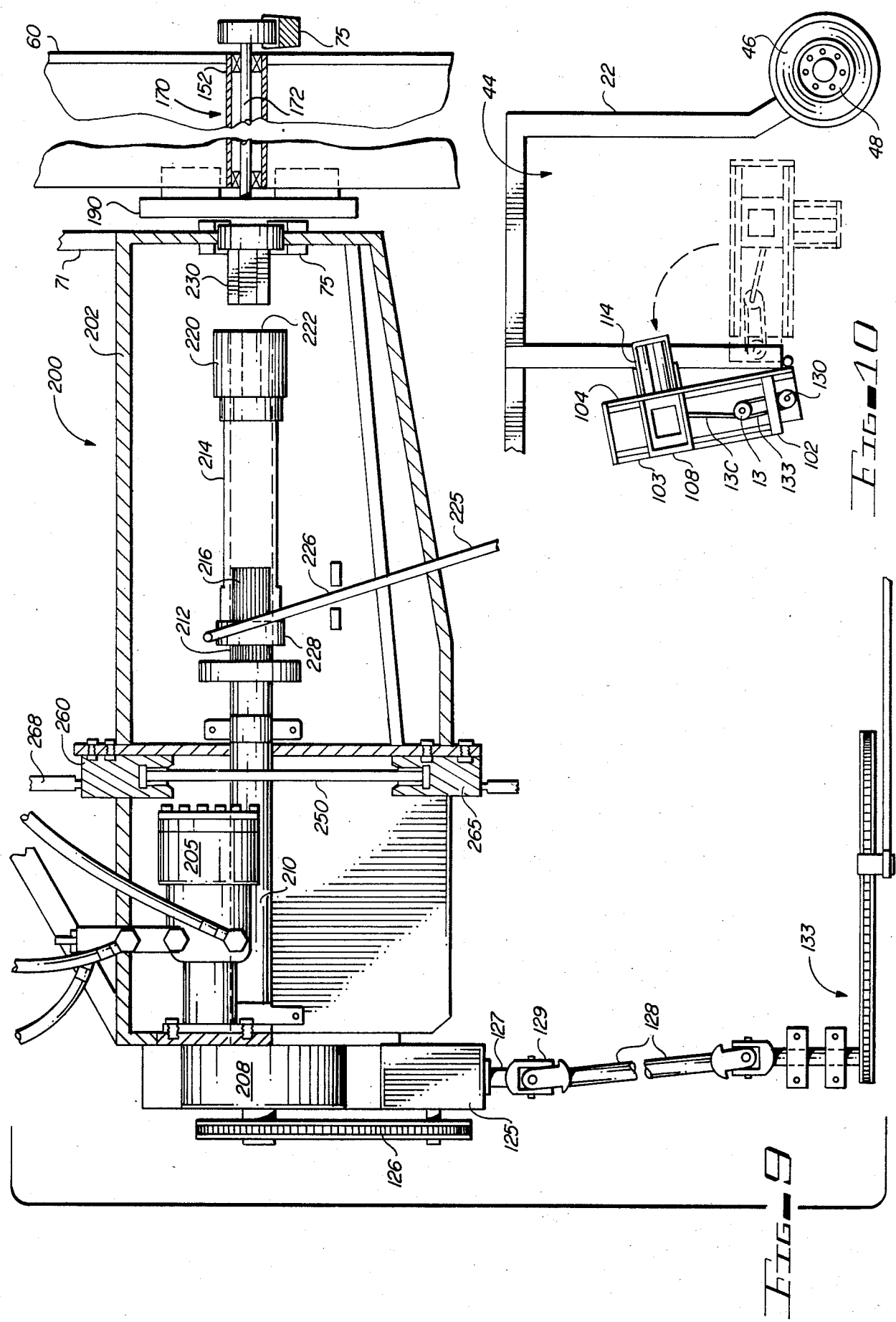

TAKE-UP DEVICE FOR DRIP IRRIGATION LINES

The present invention relates to drip irrigation systems and more particularly relates to a take-up device for retrieving drip irrigation lines from agricultural fields at the conclusion of the growing season.

Irrigation as a means of improving agricultural production has been practiced for many years. Irrigation systems typically include spray systems and flood irrigation systems. Flood irrigation in which water from canals and similar sources is carried to the agricultural fields as a particularly prevalent practice in the arrid Southwest portion of the United States and is utilized to provide moisture to a number of crops, including cotton and the like. However, increased energy costs which are reflected in the increased cost of operation of pumps and other equipment along with the general decline in the water table has caused farmers to look to new ways of delivering moisture to crops.

One such method is drip irrigation. Traditionally, drip irrigation has been used on a very limited basis for very small agricultural plots or for garden and greenhouse applications. Drip irrigation systems utilizes a relatively small diameter delivery tubing which may or may not be buried in the ground. At selected locations an appropriate emitter is positioned in the tubing line. The emitter allows a small volume of water to slowly be discharged from the delivery tube to be absorbed by the soil and eventually the growing plants.

Drip irrigation systems have a number of substantial advantages. One substantial advantage is that the water volume requirements and usage are substantially reduced. Evaporation losses are minimized and it is estimated that drip irrigation systems utilize only about fifty percent of the volume of water as compared with conventional flood irrigation systems.

Other advantages include reduced energy costs since large volumes of water are not being pumped. Beyond this, problems with weeds and the like are eliminated since the drip system delivers the moisture to the precise plant location and does not involve the flooding of large areas which creates an environment that promotes the growth of weeds and the like in the rows between the plants.

Another advantage of drip irrigation systems is that the work involved in the preparation of the field for planting is substantially reduced as compared with the flood irrigation. In flood irrigation systems precise grading and leveling of the field and ditches is required in order to insure proper delivery of water to all locations. This is accomplished utilizing expensive earthworking equipment and often involves the use of laser controlled devices to obtain precise grading to provide proper water flow. To the contrary, with drip systems water is delivered via the conduit and tube system and discharged at the desired locations. Variations or undulations in the field have little or no detrimental effect on water delivery.

In addition, another significant advantage of drip systems allows the user to precisely deliver liquid pesticides and other agricultural chemicals to the plants at predetermined times along with the irrigation water. This can be accomplished from a central control location.

As can be seen above, drip irrigation systems provide substantial advantages of efficiency and economy. Heretofore, however, drip systems have had limited application as has been pointed out above. The application of drip systems to large scale agricultural fields such as the growing of cotton over thousands and perhaps hundreds of thousands of acres has generally not been practiced. One particular problem is that the drip lines must be removed or pulled from the field at the end of the growing season. This is necessary so that the crops can be harvested and the field appropriately tilled and prepared for the subsequent growing season without any damage to the drip lines. The removal of such lines from large scale fields requires specialized equipment. Accordingly, it is apparent there exists a need in the art for a device for efficiently and effectively removing or taking-up drip irrigation lines from large scale agricultural fields.

Briefly, the present invention provides a take-up reel system for drip irrigation lines. The device is adapted to pull drip irrigation lines from the field at the conclusion of the growing season prior to harvest and cultivation. The take-up device consists of a portable frame supported on wheels or skids. Any number of take-up bays can be provided. The device is hydraulically powered usually driven by the power take off from the tractor. Each bay includes a cable spindle which is positively driven through a speed reducer and hydraulic motor. The spindle is clutched through a sliding splined shaft so the shaft can be retracted or advanced to engage or disengage the reel. A caliper disk brake is hydraulically actuated to allow the operator to control the speed of the reel. The cable spindle is detachable from the reel and may be removed from the reel and inserted into a new reel for attachment to the machine.

When the empty reels engage with the drive, the operator connects the end of the drip line to the reel feeding it first through a leveler device. The leveler includes a mechanically oscillatable arm having a spring loaded roller guide at the end. The leveler applies the line on the reel evenly in a back-and-forth motion as the reel rotates. When actuated, the reel rotates to pull the line from the field and the leveler maintains even distribution to the reel drum. The cable reels can be removed and replaced as needed. The device is also operable to control the lay-out of drip irrigation lines when the lines are being placed in the field at the beginning of the growing season.

The above and other objects and advantages of the present invention will be more fully understood from the following description, claims and drawings in which:

FIG. 1 is a perspective view of the take-up device of the present invention;

FIG. 2 is an enlarged perspective view of the leveler frame as indicated in FIG. 1;

FIG. 3 is a detail perspective view of the leveler drive arrangement;

FIG. 4 is a sectional view taken along lines 4—4 of FIG. 2;

FIG. 5 is a perspective view of the terminal end of the cable reel cradle;

FIG. 6 is a sectional view taken along lines 6—6 of FIG. 2;

FIG. 7 is a side view showing cable reel support and leveler assemblies with the leveler in a closed position;

FIG. 8 is a side view similar to FIG. 7 with one leveler assembly in an open out-of-the-way position;

FIG. 9 is a longitudinal view, partly in section, of the reel drive and clutch arrangement;

FIG. 10 is a front view of a single reel bay showing the leveler in both an open and closed position;

Figure 11:
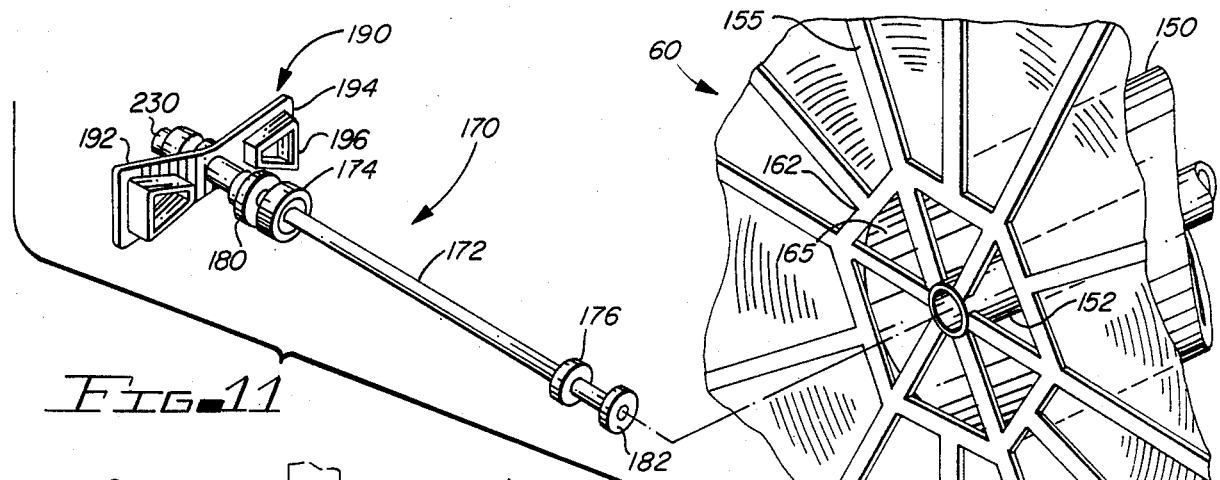
FIG. 11 is an exploded detail view of a portion of a cable reel and removable shaft.

Turning now to the drawings, the mobile take-up reel apparatus of the present invention is generally designated by the numeral 10 and includes a lower longitudinally extending frame member 12 and an upper longitudinally extending frame member 14. Transversely extending member 16 is provided at the front of the apparatus 10. Similarly transversely extending member 18 is provided at the rear of the device. The basic frame is completed by vertical upright member 20 at the front of the frame and vertically extending member 22 at the rear of the frame which connect the transverse lower members to the upper member 14. Forwardly extending tow bar assembly 24 is attached to cross member 16 and terminates at a hitch 25 adapted to be secured to the draw bar of a towing vehicle. The frame members are preferably box channels and are of welded construction or may be flanged and bolted for disassembly if necessary. The take-up device 10 is supported at the rear frame on suitable pneumatic tires 46 mounted on wheels 48 suitably carried on an axle assembly, not shown.

Extensible ground jacks 28 and 30 are provided at the opposite ends of forward cross member 16. The extensible jacks 28 and 30 are provided with ground pads 32 and may be adjusted to the appropriate length to support the frame when the device is stored or otherwise not connected to a towing vehicle. A reservoir 34 along with suitable controls and valving may be provided at the forward end of the frame to contain hydraulic fluid to supply fluid to operate the various hydraulic components of the device as will be explained hereafter.

As best seen in FIG. 1, the longitudinally extending frame defines three aligned reel bays 40, 42 and 44. It will be apparent to those skilled in the art, that the frame may be designed to accomodate any convenient number of reel bay assemblies, three being shown as typical and for convenience of representation.

Turning to FIGS. 1, 7, 8 and 14, the individual cable reel bays are best seen, bay 40 being shown for purposes for representation. A pair of frame supports having a generally horizontal section 51 extending rearwardly from upper longitudinal frame member 14 and angular frame member 50 extends between frame members 51 and lower longitudinal member 12. These support members are longitudinally spaced apart a distance approximately corresponding to the width of the drum of the cable reels 60. In the normal operating position, the reels 60 are elevated above the ground to allow them to turn freely. However, to accomodate loading and unloading the cable reels, spaced apart support arms 71 and 72 are provided each bay. The rear end of support arms 71 and 72 are pivotally secured at the lower frame member 14 at pivot point 74. The forward end of the support arms 71 and 72 each define a cradle section 75, as best seen in FIG. 5, which receives the bearing of the reel supporting shaft.

Support arms 71 and 72 are raised and lowered by means of hydraulic actuator 80 having a body 82 attached to horizontal frame member 51 at clevis 83. Extensible rod 86 of actuator 82 has its outer end connected to the support arms 71 and 72 at a suitable clevis to permit relative movement between the two members. It will be obvious that by retracting rod 86, the supported reel 60 will be elevated. Similarly, extending hydraulic actuator rod 86 will cause the associated reel to lower to ground engaging position. The details of the hydraulic system including designation of hydraulic valves and motor, location of components and the like have been omitted for clarity as these components are well known to those skilled in the art. Generally, these systems are powered by the PTO from the towing vehicle.

The application of the drip irrigation hose and pay-out of the hose is controlled by a leveling apparatus generally designated by the numeral 100. The leveling apparatus as seen in FIGS. 2, 4, 6 and 10 includes a leveling frame 102 having parallel spaced-apart tracks 103 and 104. The frame 102 is pivotally secured to the main frame at pivot shaft 106 so that the leveler frame can be pivoted to a generally vertical out-of-the-way position as shown in FIG. 10. Carriage 108 consists of a generally square frame member 109 having rollers 110 at its corners engageable with tracks 103 and 104 so that carriage 108 traverses horizontally back-and-forth along the carriage frame.

As best seen in FIG. 4, carriage frame 108 supports hose guide 113 having a generally horizontal bracket member 111 extending from the carriage frame. A pair of vertically disposed guide rollers 114 extend downwardly from the frame. Rearward of the vertical guide members are a pair of horizontally disposed rollers 115 and 116. The guide rollers are preferably constructed of a synthetic material such as nylon having relatively low frictional characteristics. The upper roller 115 is mounted for rotation on arms 119 at either end of the roller. Arms 119 are pivotally secured to side frame members 120. A spring member 121 biases the upper roller 115 downward into engagement with lower fixed roller 116. The drip hose is fed from the reel between the horizontal rollers 115, 116 and the guides 114. Because the upper horizontal roller is spring biased toward the lower fixed roller, slight tension is maintained on the hose section extending between the leveler and the reel. This prevents the irrigation hose from becoming tangled and insures that the hose is evenly placed on the reel as the carriage traverses back and forth.

The carriage 108 is caused to traverse the track mechanically by means of a drive arrangement best seen in FIGS. 3 and 9. A right angle gear reducer 125 is in driven engagement with shaft 210 through gear reducer 208. This is accomplished by chain drive 126. The output shaft 127 of the gear reducer 125 is connected to elongate drive shaft 128 through universal coupling 129. The opposite end of shaft 128 terminates at sprocket 130 mounted behind and to the left end of the carriage as seen in FIG. 9. A second sprocket 132 is aligned with sprocket 120 and positioned on bracket 134 behind the carriage. An endless pintle chain 133 extends between the two sprockets. Carriage frame 108 is pivotally secured to chain 133 by arm 134. It will be seen that as the sprocket 130 is driven by the shaft 128, chain 133 engages sprocket 132 causing the carriage to traverse back and forth along tracks 103 and 104 through arm 134. The guide assembly moves with the carriage maintaining tension on the tubing section adjacent the reel and also causing the line to be applied evenly back and forth on the face of the reel. The speed of the leveler assembly is directly related to the speed of the reel since shaft 210 is directly connected to the reel drive.

When it is desired to remove a reel or place reel in position in the machine, the entire leveler assembly can be pivoted to a generally vertical out-of-the-way position as shown in FIG. 10 by merely rotating the assembly about pivot shaft 106.

Figures 12, 13:
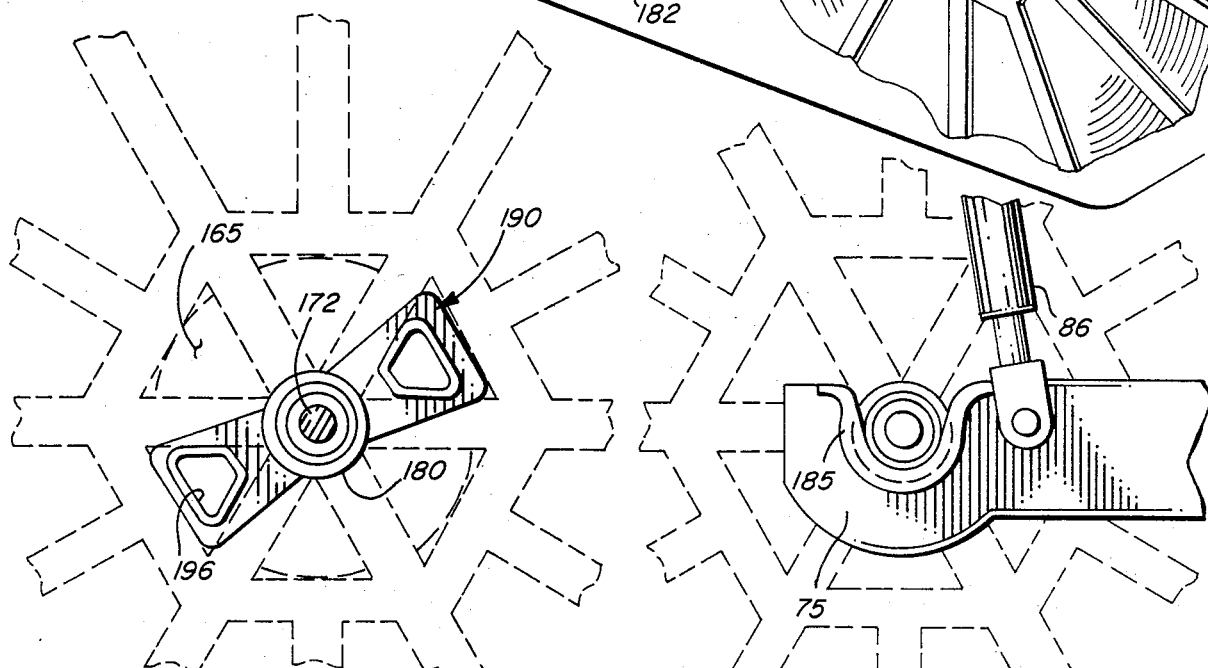
FIG. 12 is a side view showing one cable reel in position in the reel.
FIG. 13 is a side view illustrating the cable reel in position in one cradle arm support.
Figure 14:
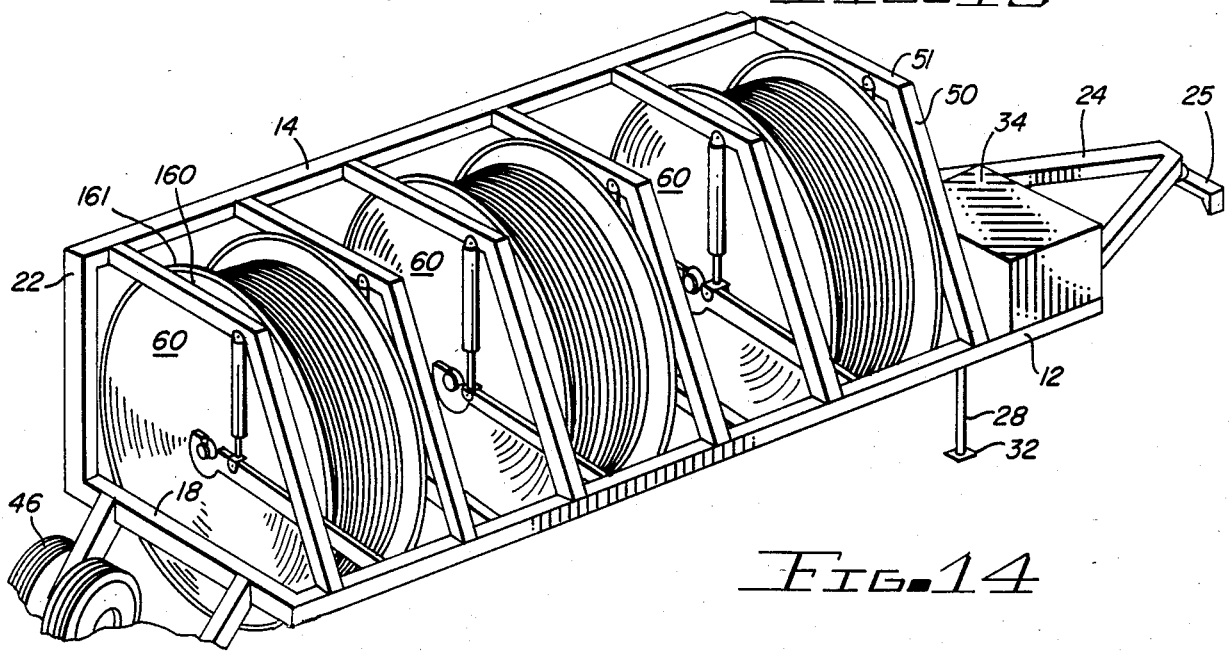
FIG. 14 is a rear perspective view of the take-up device of the present invention.

For large agricultural installations, the individual reel 60 may have a diameter of six or eight feet and have a width across the face of the drum of over three feet. In this way, as much as several miles of standard drip hose can be wound on a single reel. The reels are preferably fabricated as shown in FIGS. 11 to 13 having a generally cylindrical drum portion 150 about which the hose is wound. At the center of the reel a cylindrical spindle or hub member 152 extends transversely within the drum 150 at its center. At each side of the reel, a plurality of radial spokes 155 extend outwardly from hub 152 at each side of the reel terminating at outer circular ring 161. Both sides of the reel are constructed in similar manner. Chords 162 extend between the spokes at locations radially outwardly from the spindle 152 establishing a pattern of triangular sections 165 extending from the spindle or hub section 152.

It is normal practice to leave the drip irrigation lines stored on a reel during periods of non-use. When it is time to place the drip line in the field, the line can be payed-out from the reel. Similarly, reels remain empty during growing season and at the end of the growing season, prior to harvest and cultivation, the line is wound onto the reel. In order to facilitate these operations, a bearing assembly as seen in FIG. 11 is provided which can be secured to the reel at the time of use. Since the bearing assembly designated by the numeral 170 can be removed, it is not necessary for the operator to have a separate bearing assembly for each reel. This substantially reduces the cost of the unit and also reduces the possibility of damage and rust that would occur to the bearing components if they were an integral part of the reel and left unattended for long periods of non-use. The bearing assembly 170 consists of an elongate shaft 172 having antifriction bearing means 174 and 176 spaced apart on shaft 172 having a distance corresponding to the transverse length of hub 152. The diameter of the bearing members 174 and 176 are adapted to be received within the opposite ends of hub 152. The bearings are provided with an outer race section in an inner bearing so that the bearing may turn with the shaft 172 relative to the race.

A second set of bearings 180 and 182 are provided on shaft 172 outwardly spaced from bearings 174 and 176. Bearings 180 and 182 similarly have an inner bearing set and an outer circumferential race. Bearings 180 and 182 are spaced apart a distance corresponding to the distance between the cradle supports 75 at the end of arms 71 and 72. Bearings 180 and 182 are adapted to be received within the cradles 75 as best seen in FIG. 5. A retaining lip 185 is provided either side of cradle 75 to retain the bearing in place. In this way, the reel is supported for rotation on the bearings.

A reel locking member 190 is secured to shaft 172 between bearings 174 and 180. The locking member consists of oppositely extending arms 192 and 194 each having a locking projection 196 extending inwardly. The configuration of locking member 196 generally conforms to the configuration of opening 165 in the reel as best seen in FIG. 5. Thus, referring to FIG. 12, when the bearing shaft assembly is inserted within hub 152, the projections 196 engage corresponding openings 165. Rotation of the shaft at hex end 230 will impart rotation to the reel through the reel locking member 190.

Rotation of the reel is imparted by drive member 200, best shown in FIG. 9. Drive member 200 is secured on the end of arm 71 axially aligned with the reel centerline in each bay. The drive assembly includes a housing 202 welded or otherwise secured to the end of arm 71. The drive includes a hydraulic motor 205 which drives axially extending shaft 210 through gear reducer 208. Shaft 210 is provided with a splined outer end 212. A clutch shaft 214 has an end 216 with internal splines and is slidingly engageable on splined end 212 of shaft 210. The opposite end of clutch shaft 214 is provided with coupling 220 having a hexagonal socket internal member 222. Actuator arm 225 is pivotally connected to the housing at 226. The inner end of arm 225 is connected to clutch member 214 at collar 228. Actuation of arm 225 to the left as viewed in FIG. 9, will move clutch shaft 214 rightward bringing hex socket 220 into engagement with the hexagonal end 230 of the reel bearing shaft assembly 170. As has been discussed above, the reel bearing assembly is oppositely supported in bearings at cradles 75 carried on the outer ends of arms 71 and 72. With the clutch shaft 214 engaged to the reel bearing shaft, actuation of hydraulic motor 205 will impart rotation to the reel. To disengage the drive, actuator shaft 225 is moved rightward as seen in FIG. 5, causing the clutch to move leftwardly on splines 212. With the clutch disengaged, the reel support arms 71 and 72 may be lowered and the reel manually removed from the supporting cradles 75. As has been discussed, shaft 210 at the left end of the housing 202 drives the mechanical leveler assembly.

The clutch assembly further includes a brake having a disc plate 250 secured to shaft 210 and rotatable therewith. Calipers 260 and 265 are positioned at opposite sides of the brake disc 250. The calipers are hydraulically actuated through pressurization of line 268 and upon actuation will engage the opposite surfaces of the brake disc 250 causing the brake disc and attached shaft 210 to slow down or stop. This enables the operator to control the speed of the reel. In the event the reel speed becomes excessive, the reel can be slowed down by actuation of the brake to prevent back lash.

The construction and operation of the reel take-up apparatus of the present invention will be more apparent from the following description of use.

At the conclusion of the growing season prior to harvest and cultivation, it is necessary to remove the irrigation lines from the field. Generally, in growing crops such as cotton, the irrigation lines will be placed in the field extending between adjacent crop rows or berms. It is generally only necessary to place a line between every other row or berm since a single drip line will serve to irrigate each of the adjacent rows or berms on either side of the line. When it is necessary to harvest and cultivate, damage may occur to the lines if they are not removed. At this time, a towing vehicle would be secured to the tow bar 24 at hitch 25 and the device 10 pulled to the field. Generally a roadway or accessway is provided at the end of the field, perpendicular to the rows. As has been pointed out above, in large commercial agricultural installations, the length of the field may extend for over a quarter mile and with large diameter reels as described herein, several miles, up to five or more, of hose can be accomodated on a single reel. The device 10 is aligned at one edge of the field with each of the bays 40, 42, 44 aligned with a run of tubing. The tubing is disconnected from the supply conduit and attached to the respective reel on the take-up apparatus. Any number of bays can be provided, with three being shown for purposes of explanation. Each of the individual reels 60 is empty and has first been provided with a reel bearing assembly as seen in FIG. 5. The bearing assembly has a locking member 190 which engages appropriate openings 165 at the reel side. The reel is supported at arms 71, 72 in cradles at appropriate antifriction bearings. The leveler assembly is maintained in an out-of-the-way position when loading the reel.

Prior to securing the inner end of the hose to the reel, the inner end of the hose is extended through the guide member 114 and between rollers 115, 116. When this has been accomplished, clutch members 212 and 216 are engaged and the hydraulic system is actuated causing the reel to rotate in a direction to take-up the line. As the line is taken up, the leveler carriage 108 will reciprocate in relationship to the reel speed applying the line evenly in a back-and-forth motion on the drum portion 150 of the cable reel 60. Tension is maintained on the hose section between the leveler and the reel. The brake system may be used to control the reel speed.

When a run of cable is entirely pulled in, the hydraulic system is shut down and the towing vehicle engaged to advance the take-up apparatus to the next three adjacent runs of tubing in the field. The tubing in the field has its end connected to the end of the tubing section on the reel by insertion of an appropriate connector or emitter and the operation repeated until the reel is full. When the reel is full, the leveler frame can be swung out-of-the-way at pivot 106. With the leveler frame in the out-of-the-way position, actuators 80 are pressurized causing the respective rod 86 to downwardly extend which lowers arms 71, 72 and the reel into the ground engaging position. The clutch actuator 225 is moved rightwardly disengaging the hex end 230 of the bearing shaft assembly from the clutch permitting the operator to manually remove the reel from the device. The bearing shaft assembly 190 can be withdrawn from the hub 152 of reel 60 and inserted in an empty reel. Thereafter, the new empty reel can be moved into position in the bay and place with bearings 182 and 180 in position in the cradle 75 at the end of the support arms. The reel is raised to the operative position by actuator 80 and the leveler frame lowered into position.

If the device is to be used to pay-out line to position the drip tubing in the field, the device is again aligned in the field at the end of the rows generally perpendicular to the rows. With the full reels in place supported in the cradles at the end of the support arms 71 and 72, the clutch assembly 200 is engaged and hydraulic motors actuated in a direction to pay-out line. As the line is payed-out, it can be placed in the rows either manually or by a suitable vehicle.

From the foregoing, it will be seen that the present invention provides a simple, effective and highly versatile device for taking up and paying out drip irrigation line. The device has a large capacity and can be adapted to the needs of the particular grower. The large capacity reels make the device efficient and convenient.

It will be obvious to those skilled in the art to make various changes, alterations and modifications to the take-up reel apparatus of the present invention. To the extent these changes, alterations and modifications do not depart from the spirit and scope of the appended claims, they are intended to be encompassed therein.

I claim:

1. A device for taking up and paying out tubing of the type used for drip irrigation systems, said device comprising:
   (a) a portable frame assembly defining at least one bay having a front;
   (b) reel support means associated with said bay, said reel support means including a pair of oppositely disposed arms terminating at cradles adapted to engage and support said reel for rotation and means for raising and lowering said reel support means;
   (c) leveling means associated with said bay, said leveling means including guide means reciprocable to guide the application of said tubing on said reel as said reel rotates in relationship to the speed of the reel, said reel leveling means being pivotally connected to said frame and having a first position adjacent the face of said bay and wherein said guide means reciprocates transversely of said bay and being pivotal to a second out-of-the-way position providing access at the front of said bay;
   (d) said leveling means further including means for maintaining tension on the section of tubing extending between the reel and the said guide;
   (e) reel support spindle shaft means adapted to support said reel for rotation and receivable in said opposed cradles, said spindle shaft means including antifriction bearing means and locking means for selectively engaging said reel for rotation with said shaft, said spindle shaft, bearing means and locking means being detachable from said reel and said cradles; and
   (f) drive means selectively engageable through clutch means with said spindle shaft means, said drive means further including braking means for selectively breaking the rotation of said reel.

* * * * *